US008634886B1

(12) United States Patent
Samuels et al.

(10) Patent No.: US 8,634,886 B1
(45) Date of Patent: Jan. 21, 2014

(54) RING-STYLE MINIATURE MOBILE TELEPHONE SYSTEM

(76) Inventors: Sonya N. Samuels, Leesburg, FL (US); Kyle B. Leeks, Sioux Falls, SD (US)

(*) Notice: Subject to any disclaimer, the term of this patent is extended or adjusted under 35 U.S.C. 154(b) by 315 days.

(21) Appl. No.: 13/238,496

(22) Filed: Sep. 21, 2011

(51) Int. Cl.
*H04M 1/00* (2006.01)

(52) U.S. Cl.
USPC ......... 455/575.6; 455/66.1; 455/74; 455/566; 379/433.1; D14/138 R; 235/472.01

(58) Field of Classification Search
USPC ............... 455/575.6, 66.1, 74, 403, 561, 566, 455/575.1; 379/433.1; D14/137, 138 R; 235/472.01
See application file for complete search history.

(56) References Cited

U.S. PATENT DOCUMENTS

| 5,239,521 A | 8/1993 | Blonder |
| 5,274,613 A | 12/1993 | Seager |
| 5,467,324 A | 11/1995 | Houlihan |
| D381,653 S | 7/1997 | Voroba et al. |
| 5,659,611 A | 8/1997 | Saksa |
| 5,987,310 A | 11/1999 | Gray |
| 2011/0068926 A1* | 3/2011 | Jong et al. ................. 340/573.1 |

* cited by examiner

*Primary Examiner* — Shaima Q Aminzay

(57) ABSTRACT

A miniature mobile phone system having a ring, a base on a top surface of the ring, the base has a first and second side edge, and a top surface, the side edges have a concave curvature, a mobile telephone on the top surface of the base, the mobile telephone having a display, a plurality of keys, a microphone, a speaker, and an antenna, a microprocessor operatively connected to the display, keys, microphone, speaker, antenna, and a power source, and a micro-cell phone system operatively connected to the microprocessor, the micro-cell phone system having a transmitter and a receiver, the transmitter is adapted to send output signals to a mobile phone tower in a standard manner and the receiver is adapted to receive input signals from a mobile phone tower in a standard manner.

7 Claims, 3 Drawing Sheets

(In-use View)

(Block Diagram)

(Bottom View)

(Side View)

(In-use View)

(Block Diagram)

RING-STYLE MINIATURE MOBILE TELEPHONE SYSTEM

FIELD OF THE INVENTION

The present invention is directed to a miniature mobile telephone, more particularly to a miniature mobile telephone worn on a finger like a ring.

BACKGROUND OF THE INVENTION

The present invention features a miniature mobile telephone system. The system features a ring for wearing the miniature mobile telephone on a finger like a ring.

SUMMARY

The present invention features a ring-style miniature mobile telephone system. In some embodiments, the system comprises a ring; a base disposed on a top surface of the ring, the base has a first side edge, a second side edge, and a top surface, the side edges, have a concave curvature; a mobile telephone disposed on the top surface of the base, the mobile telephone comprises a display, a plurality of keys, a microphone, a speaker, and an antenna; a microprocessor operatively connected to the display, the keys, the microphone, the speaker, the antenna, and a power source; and a micro-cell phone system operatively connected to the microprocessor, the micro-cell phone system comprises a transmitter and a receiver, the transmitter is adapted to send output signals to a mobile phone tower in a standard manner and the receiver is adapted to receive input signals from a mobile phone tower in a standard manner, wherein input signals received by the receiver are transferred to the microprocessor via the micro-cell phone system, wherein the input signals are further transferred to the speaker via a digital-to-analog converter, wherein output signals generated by the microphone are transferred to the microprocessor via an analog-to-digital converter wherein the output signals are further transferred to the transmitter via the micro-cell phone system.

In some embodiments, the keys represent the numbers and symbols 1, 2, 3, 4, 5, 6, 7, 8, 9, 0, #, and *. In some embodiments, the antenna is internal with respect to the mobile telephone. In some embodiments, the antenna is external with respect to the mobile telephone. In some embodiments, the power source is a rechargeable battery. In some embodiments, the system further comprises a power button disposed on a bottom surface of the ring, the power button can move between a first position and a second position respectively turning on and off the mobile telephone. In some embodiments, the system further comprises a universal serial bus (USB) port disposed on the mobile telephone, the USB port is operatively connected to the microprocessor.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
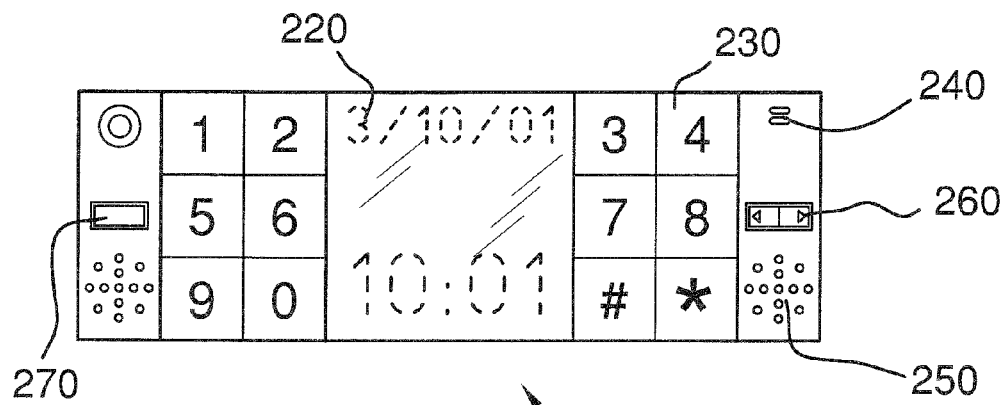
FIG. 1 is a top view of the system of the present invention.
Figure 2:
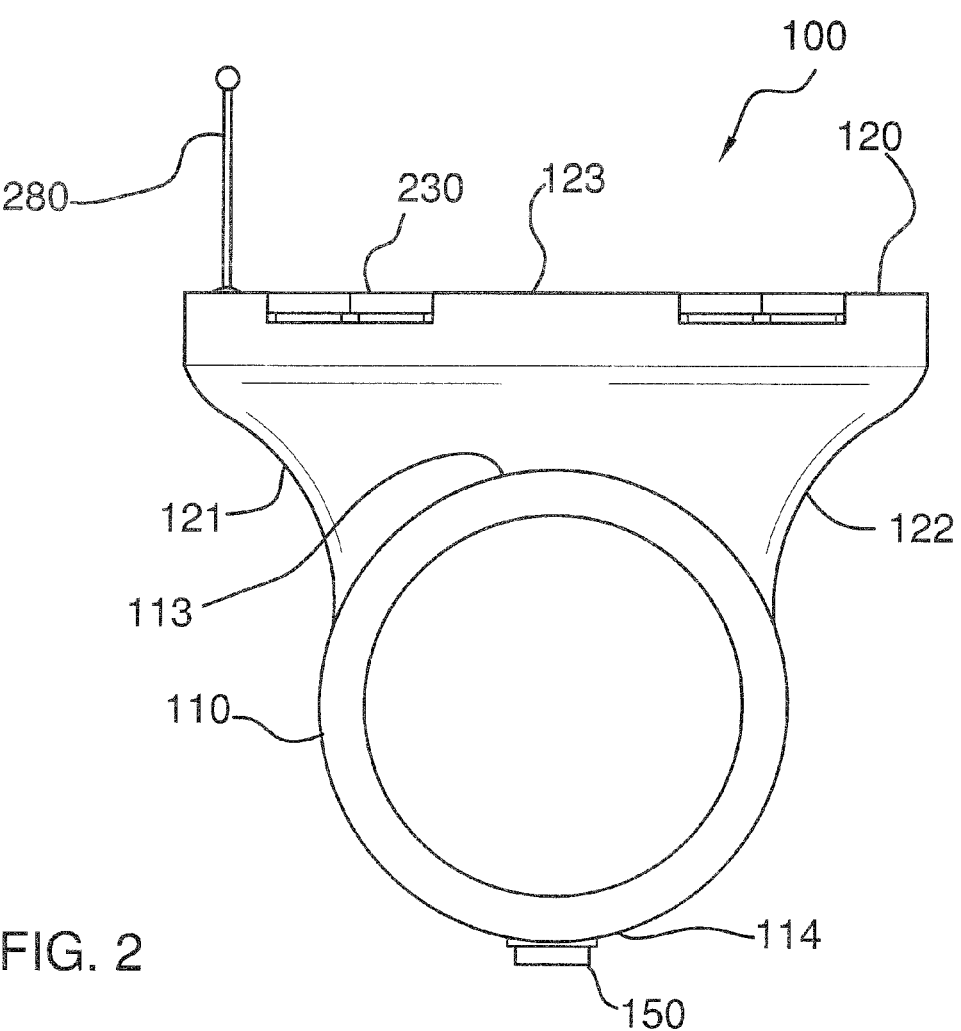
FIG. 2 is a front view of the system of the present invention.
Figure 3:
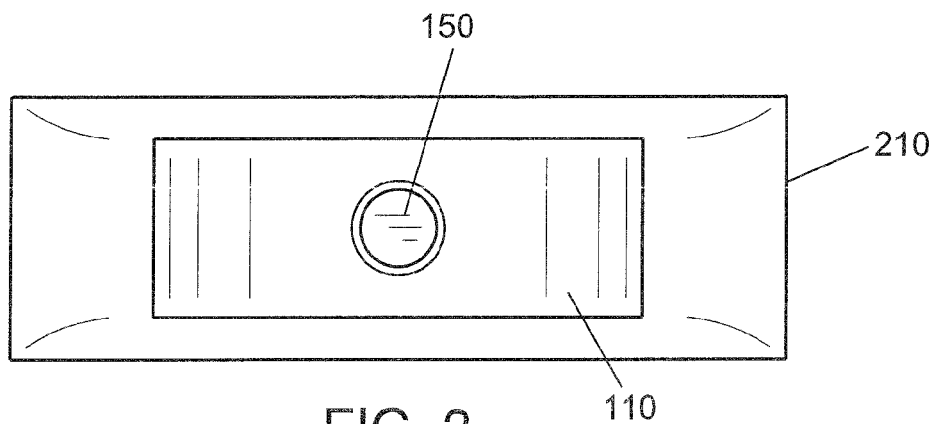
FIG. 3 is a bottom view of the system of the present invention.
Figure 4:
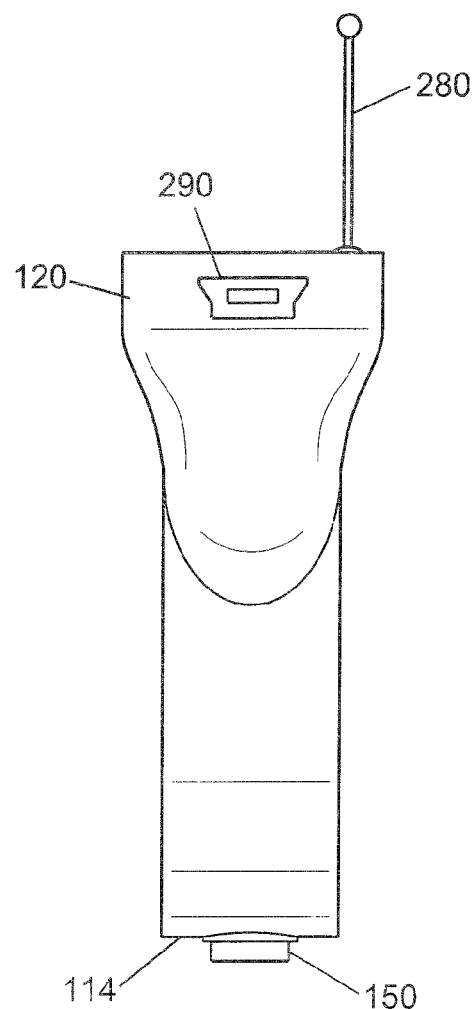
FIG. 4 is a side view of the system of the present invention.
Figure 5:
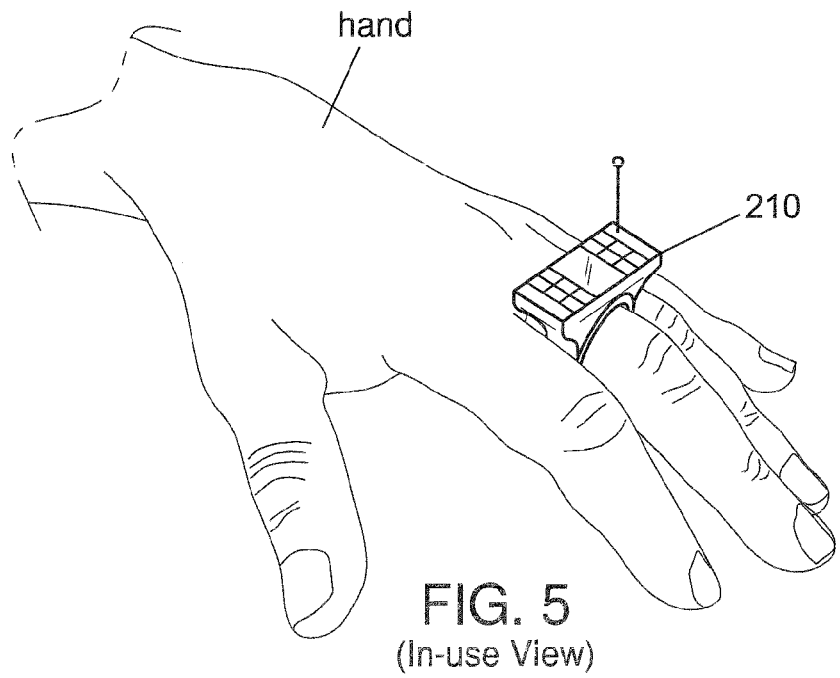
FIG. 5 is an in-use view of the system of the present invention.
Figure 6:
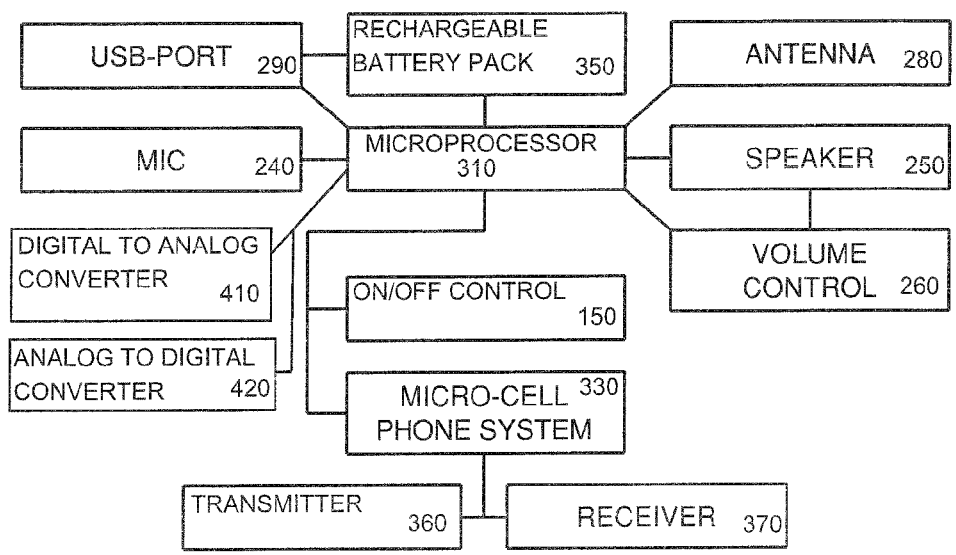
FIG. 6 is a schematic representation of the electrical components of the system of the present invention.

Referring now to FIG. 1-6, the present invention features a miniature mobile phone system 100. The system 100 comprises a ring 110. The ring 110 resembles standard band-style rings worn on fingers. Such rings are well known to one of ordinary skill in the art.

A base 120 is disposed on the top surface 113 of the ring 110. The base 120 has a first side edge 121, a second side edge 122, and a top surface 123. The top surface 123 is generally flat. The side edges 121, 122 are curved (see FIG. 2), e.g., a concave curvature. The curvature provides comfort to the user.

Disposed on the top surface 123 of the base 120 is a mobile telephone 210. The mobile telephone 210 comprises many standard features of a standard mobile telephone (in smaller sizes). As shown in FIG. 1, the mobile telephone 210 comprises a display 220 and a plurality of keys 230 (e.g., representing the numbers and/or symbols, e.g., 1, 2, 3, 4, 5, 6, 7, 8, 9, 0, #, *). The keys 230 are used to dial phone numbers. In some embodiments, the display 220 displays the time and/or the date and/or the data being entered via the keys 230. The mobile telephone 210 further comprises a microphone 240. The mobile telephone 210 further comprises a speaker 250. In some embodiments, the mobile telephone 210 further comprises a volume control button 260. In some embodiments, the mobile telephone 210 further comprises a mute button 270 (e.g., on/off tone). In some embodiments the volume control button 260 is operatively connected to the speaker 250.

The mobile telephone 210 further comprises an antenna 280. In some embodiments, the antenna 280 is internal. In some embodiments, the antenna 280 is external (e.g., see FIG. 2).

The system 100 further comprises a microprocessor 310 disposed in the mobile telephone 210. The microprocessor 310 is operatively connected to the antenna 280, the speaker 250, the microphone 240, and a micro-cell phone system 330.

The micro-cell phone system 330 comprises a transmitter 360 and receiver 370 and is operatively connected to the microprocessor 310. The transmitter 360 is adapted to send output signals to mobile phone towers in a standard manner. The receiver 370 is adapted to receive input signals from the mobile phone towers in a standard manner. The micro-cell phone system 330 transfers the input signals from the receiver 370 to microprocessor, wherein the signals are further transferred to the speaker (e.g., via a digital-to-analog converter 410). The micro-cell phone system 330 transfers the output signals from the microprocessor 310 to the transmitter 360. The output signals originate from the user via the microphone 240. The microprocessor 310 converts the analog sound to a digital sound (e.g., via an analog-to-digital converter 420) before sending the output signals to the micro-cell phone system.

In some embodiments, the system 100 further comprises a digital-to-analog converter 410 for converting digital signals received by the micro-cell phone system 330 and/or microprocessor 310 to analog sound to be played by the speaker 250. Digital-to-analog converters are well known to one of ordinary skill in the art. The digital-to-analog converter 410 may be operatively connected to the microprocessor 310. The digital-to-analog converter 410 may be operatively connected to the speaker 250.

In some embodiments, the system 100 further comprises an analog-to-digital converter 420 for converting analog signals received by the microprocessor 310 (from the microphone 240) to digital signals. Analog-to-digital converters are well known to one of ordinary skill in the art. The analog-to-digital converter 420 may be operatively connected to the microprocessor 310. The analog-to-digital converter 420 may be operatively connected to the microphone 240.

The system 100 further comprises a power source 350 (e.g., a rechargeable battery) operatively connected to the microprocessor 310.

A power button 150 is disposed on the bottom surface 114 of the ring 110. The power button 150 can move between a first position and a second position respectively turning on and off the mobile telephone 210. Power buttons are well known to one of ordinary skill in the art. The power button 150 may be operatively connected to the microprocessor 310.

In some embodiments, the mobile telephone 210 further comprises a universal serial bus (USB) port 290 (e.g., disposed in a side of the mobile telephone 210). USB ports are well known to one of ordinary skill in the art. The USB port 290 is operatively connected to the microprocessor 310. In some embodiments, the USB port 290 is operatively connected to the power source 350.

The disclosures of the following U.S. patents are incorporated in their entirety by reference herein: U.S. Pat. No. 5,659,611; U.S. Pat. No. 5,239,521; U.S. Pat. No. 5,467,324; U.S. Pat. No. 5,274,613; U.S. Design Pat. No. D381653; U.S. Pat. No. 5,987,310.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system 100 comprising:
    (a) a ring 110;
    (b) a base 120 disposed on a top surface 113 of the ring 110, the base 120 has a first side edge 121, a second side edge 122, and a top surface 123, the side edges 121, 122 have a concave curvature;
    (c) a mobile telephone 210 disposed on the top surface of the base 120, the mobile telephone 210 comprises a display 220, a plurality of keys 230, a microphone 240, a speaker 250, and an antenna 280;
    (d) a microprocessor 310 operatively connected to the display 220, the keys 230, the microphone 240, the speaker 250, the antenna 280, and a power source 350; and
    (e) a micro-cell phone system 330 operatively connected to the microprocessor 310, the micro-cell phone system 330 comprises a transmitter 360 and a receiver 370, the transmitter 360 is adapted to send output signals to a mobile phone tower in a standard manner and the receiver 370 is adapted to receive input signals from a mobile phone tower in a standard manner, wherein input signals received by the receiver 370 are transferred to the microprocessor 310 via the micro-cell phone system 330, wherein the input signals are further transferred to the speaker 250 via a digital-to-analog converter 410, wherein output signals generated by the microphone 240 are transferred to the microprocessor 310 via an analog-to-digital converter 420 wherein the output signals are further transferred to the transmitter 360 via the micro-cell phone system 330.

2. The system 100 of claim 1, wherein the keys 230 represent the numbers and symbols 1, 2, 3, 4, 5, 6, 7, 8, 9, 0, #, and *.

3. The system 100 of claim 1, wherein the antenna 280 is internal with respect to the mobile telephone 210.

4. The system 100 of claim 1, wherein the antenna 280 is external with respect to the mobile telephone 210.

5. The system 100 of claim 1, wherein the power source 250 is a rechargeable battery.

6. The system 100 of claim 1 further comprising a power button 150 disposed on a bottom surface 114 of the ring 110, the power button 150 can move between a first position and a second position respectively turning on and off the mobile telephone 210.

7. The system 100 of claim 1 further comprising a universal serial bus (USB) port 290 disposed on the mobile telephone 210, the USB port 290 is operatively connected to the microprocessor 330.

* * * * *